United States Patent [19]

Takahashi

[11] 4,380,053
[45] Apr. 12, 1983

[54] MEMORY ADDRESSING SYSTEM FOR SEQUENTIALLY ACCESSING ALL MEMORY ADDRESSES IN A MEMORY AREA

[75] Inventor: Hiroshi Takahashi, Yokohama, Japan

[73] Assignee: Canon Kabushiki Kaisha, Tokyo, Japan

[21] Appl. No.: 192,219

[22] Filed: Sep. 30, 1980

[30] Foreign Application Priority Data

Oct. 17, 1979 [JP] Japan .................................. 54-132826

[51] Int. Cl.³ ............................................... G06F 3/02
[52] U.S. Cl. .................................................... 364/900
[58] Field of Search ... 364/200 MS File, 900 MS File, 364/706, 709, 710

[56] References Cited

U.S. PATENT DOCUMENTS 3,911,424 10/1975 Giannuzzi et al. ............ 364/706 X
3,973,113 8/1976 Goldsamt ............................ 364/709
4,156,281 5/1979 Hirano et al. ................... 364/710 X Primary Examiner—Harvey E. Springborn
Attorney, Agent, or Firm—Fitzpatrick, Cella, Harper & Scinto

[57] ABSTRACT

An improved memory addressing system is incorporated in an electronic calculator having input keys for entering numerical data, operational instructions and memory control instructions, a memory for storing the numerical data, and a processor for executing the operational instructions and memory control instructions with numerical data transferred to or from the memory. The keys may be operated in a specific sequence that designates an area in the memory comprising a plurality of memory addresses. A detector detects actuation of the keys in the specific sequence and generates an output signal indicative thereof. A memory access control then sequentially accesses all of the addresses in the memory area in response to the output signal.

3 Claims, 7 Drawing Figures

| | 1 | 2 | 3 | 4 | 5 | 6 | 7 | 8 | 9 |
|---|---|---|---|---|---|---|---|---|---|
| 1 | M1·1 | M1·2 | M1·3 | M1·4 | M1·5 | M1·6 | M1·7 | M1·8 | M1·9 |
| 2 | M2·1 | M2·2 | M2·3 | M2·4 | M2·5 | M2·6 | M2·7 | M2·8 | M2·9 |
| 3 | M3·1 | M3·2 | M3·3 | M3·4 | M3·5 | M3·6 | M3·7 | M3·8 | M3·9 |
| 4 | M4·1 | M4·2 | M4·3 | M4·4 | M4·5 | M4·6 | M4·7 | M4·8 | M4·9 |
| 5 | M5·1 | M5·2 | M5·3 | M5·4 | M5·5 | M5·6 | M5·7 | M5·8 | M5·9 |
| 6 | M6·1 | M6·2 | M6·3 | M6·4 | M6·5 | M6·6 | M6·7 | M6·8 | M6·9 |
| 7 | M7·1 | M7·2 | M7·3 | M7·4 | M7·5 | M7·6 | M7·7 | M7·8 | M7·9 |
| 8 | M8·1 | M8·2 | M8·3 | M8·4 | M8·5 | M8·6 | M8·7 | M8·8 | M8·9 |
| 9 | M9·1 | M9·2 | M9·3 | M9·4 | M9·5 | M9·6 | M9·7 | M9·8 | M9·9 |

| ℓ\n | 1 | 2 | 3 | 4 | 5 | 6 | 7 | 8 | 9 |
|---|---|---|---|---|---|---|---|---|---|
| 1 | 2.000 | 8.400 | 500 | 310 | 2.400 | 0 | 0 | 0 | 0 |
| 2 | 2.400 | 1.900 | 100 | 1.060 | 2.400 | 0 | 0 | 0 | 0 |
| 3 | 1.000 | 7.800 | 950 | 800 | 1.320 | 0 | 0 | 0 | 0 |
| 4 | 1.600 | 3.000 | 200 | 930 | 1.450 | 0 | 0 | 0 | 0 |
| 5 | 0 | 0 | 0 | 0 | 0 | 0 | 0 | 0 | 0 |
| 6 | 0 | 0 | 0 | 0 | 0 | 0 | 0 | 0 | 0 |
| 7 | 0 | 0 | 0 | 0 | 0 | 0 | 0 | 0 | 0 |
| 8 | 0 | 0 | 0 | 0 | 0 | 0 | 0 | 0 | 0 |
| 9 | 0 | 0 | 0 | 0 | 0 | 0 | 0 | 0 | 0 |

4,380,053

MEMORY ADDRESSING SYSTEM FOR SEQUENTIALLY ACCESSING ALL MEMORY ADDRESSES IN A MEMORY AREA

BACKGROUND OF THE INVENTION

1. Field of the Invention

The present invention relates to a memory addressing system for an electronic calculator capable of making calculations on data, stored in a memory, through simple key operations.

2. Description of the Prior Art

Data processing, such as partial summations or calculation of percentages of various items, involving a large amount of numerical data for the purposes of accounting or inventory control has previously required the use of calculators specifically designed for such purposes or of general-purpose business calculators. Such data processing is, to a certain extent, possible with ordinary electronic calculators but, because ordinary calculators usually lack a programming function, the data processing often involves extremely tedious repeated calculations.

SUMMARY OF THE INVENTION

The object of the present invention is to provide a memory addressing system that mitigates the above-mentioned drawbacks and enables an electronic calculator to process data to obtain, for example, partial summations and percentages of various items, even when a large amount of numerical data is involved. Yet this processing can be accomplished by means of extremely simple operations.

DETAILED DESCRIPTION OF THE PREFERRED EMBODIMENTS

Now the present invention will be explained in detail by reference to an embodiment thereof shown in the attached drawings.

Figures 1, 2:
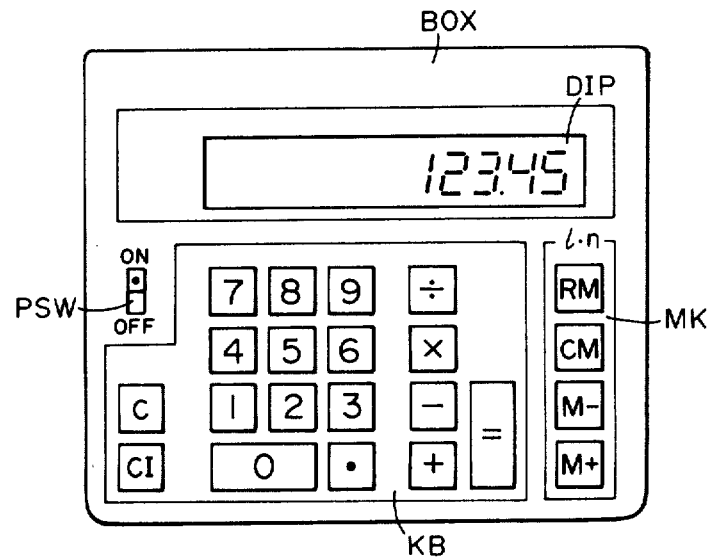
FIG. 1 is a plan view of the electronic calculator embodying the present invention.
FIG. 2 is a view of the memory structure for explaining the memory addressing system of the present invention.

FIG. 1 is a plan view showing the arrangement of keys and switches in an electronic calculator incorporating the memory addressing system of the present invention. The calculator body BOX is provided with a numerical display device DIP for displaying the results of calculations and entered numerical data; keys KB for entering operational instructions and numerical data; memory control keys MK; and a power switch PSW. Said keys KB includes an all-clear key "C", an entry correction key "CI", numerical input keys "0"through "9", a decimal point key ".", operation instruction keys "+", "−", "×" and "÷", an execution start key "=" etc. Also the memory control keys MK includes a key "M+" for adding the displayed numerical value to the numerical value stored in the memory, a key "M−" for similarly subtracting the displayed numerical value from that stored in memory, a key "RM" for reading the data from the memory, a key "CM" for clearing the memory etc.

FIG. 2 shows the relation between the memory of the present invention and the addresses therein. The memory MEM is constructed as a matrix of l lines and n columns, for example 9 lines and 9 columns. The memory MEM thus contains 81 addresses represented by $M_{ij}$ (i, j = 1, 2, ..., 9). Calculations with data stored in a particular address area of the memory MEM can be executed simply by operation of the instruction keys and the numerical keys. For example data readout from an address $M_{5.7}$ is achieved by actuating, in succession, the memory data readout key "RM" and numerical keys "5", "." and "7". Such addressing method is already known, but the present invention is also capable of simultaneously addressing an entire line or column by actuating keys to designate an address other than one of the 81 address actually available in the memory MEM for data storage. In this way the calculation, readout or erasure of the data stored in the designated lines or columns of addresses may be accomplished more efficiently. It is now assumed that the number "0" is for example, used as the line or column designating address which otherwise would indicate an address other than one available for data storage. In this example, then, actuations of the "CM", "4", "." and "0" keys in succession cause erasure of the data stored in the address areas $M_{4.1}$ through $M_{4.9}$ of the memory MEM. Also the key actuations in the order of "+", "RM", "0", "." and "6" cause the data stored in the addresses $M_{1.6}$ through $M_{9.6}$ to be recalled and added, thus giving the sum of the data in the sixth column.

Figures 3, 4:
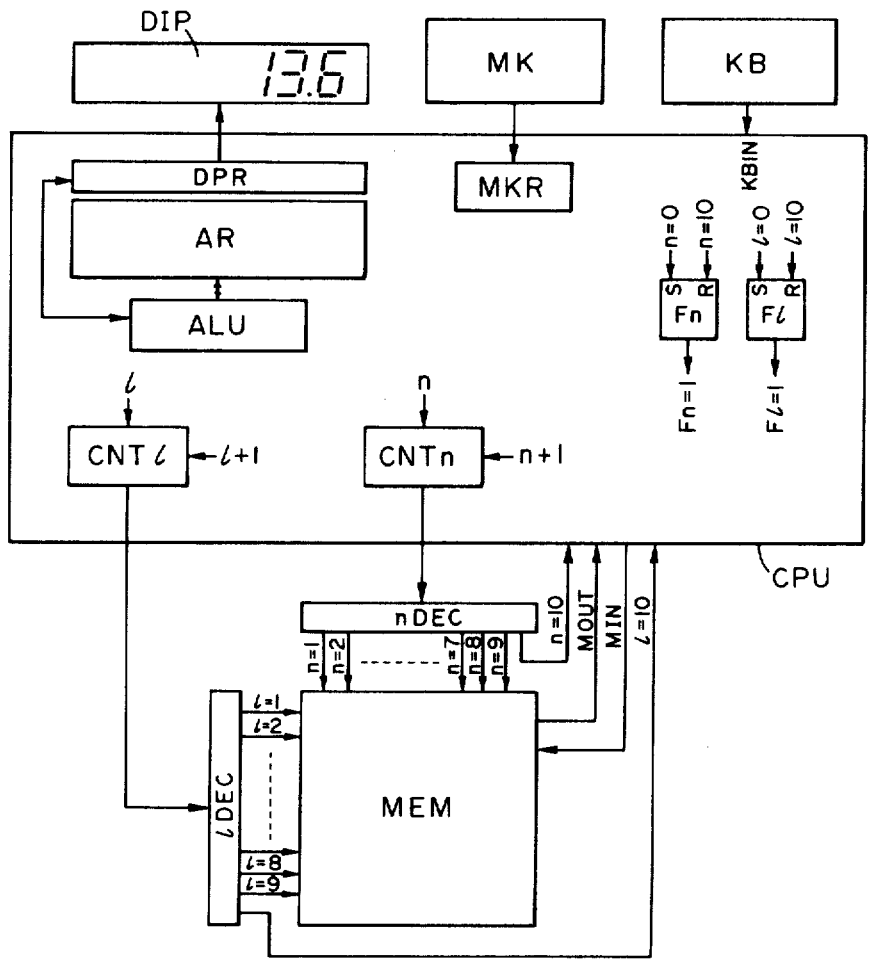
FIG. 3 is a block diagram illustrating the structure of the electronic calculator shown in FIG. 1.
FIG. 4 is a chart showing an example of data to be stored in the memory shown in FIG. 2.

FIG. 3 is a schematic block diagram of the electronic calculator of the present invention, wherein the keys corresponding to those shown in FIG. 1 are represented by corresponding symbols. In the circuit shown in FIG. 3, a processor CPU is provided with a register MKR, flip-flops Fl, Fn and counters CNTl, CNTn in addition to an arithmetic logic unit ALU, an arithmetic register AR and a display register DPR similar to those in the ordinary calculators. The register MKR is adapted to store instructions for data processing (write-in), data readout or data erasure in response to the actuation of any one of keys "M+", "M−", "RM" or "CM". The flip-flops Fl, Fn are set respectively in the cases where l=0 or n=0 in memory address l·n entered from the numeral keys KB, and are reset after the processing of data stored in addresses actually designated in the memory MEM. The counters CNTl and CNTn respectively store the numbers l and n entered from the numeral keys KB and are advanced in incremental steps respectively by instructions l+1 and n+1, generated when the numbers l and n include a value "0" indicating that data in an entire line or column is designated to be processed. As already explained, the memory MEM has a structure of 9×9 matrix, of which lines and columns are selected respectively by the output signals of said counters CNTl and CNTn decoded respectively by decoders lDEC and nDEc. However and since said counters CNTl, CNTn are incrementally advanced in succession by the signals l+1, n+1" generated upon receipt of a signal L or N equal to "0", the signals input to the decoders lDEC, nDEC may include the value l=10 or n=10. In this case the output signals from said decoders are ignored in addressing the memory MEM but are directly supplied to the processor CPU for respectively resetting the flip-flops Fn and Fl. The memory MEM receives the input data MIN from the processor CPU and supplies the readout data MOUT to said processor CPU.

In the following example, the function of the present invention will be explained in detail by reference to calculations with a calculator incorporating the memory addressing system of the present invention on the data listed in Tab. 1 showing sales results of a wholesaler to four retail shops.

TABLE 1

| Article | (a) | (b) | (c) | (d) | (e) | Total by shop |
|---|---|---|---|---|---|---|
| Shop A | $2,000 | $8,400 | $500 | $310 | $2,400 | $13,610 |
| Shop B | $2,400 | $1,900 | $100 | $1,060 | $2,400 | $7,860 |
| Shop C | $1,000 | $7,800 | $950 | $800 | $1,320 | $11,870 |
| Shop D | $1,600 | $3,000 | $200 | $930 | $1,450 | $7,180 |
| Total by article | $7,000 | $21,000 | $1,750 | $3,100 | $7,570 | $40,520 |
| Percentage of article | 17.28% | 52.07% | 4.32% | 7.65% | 18.68% | 100% |

Figure 5:
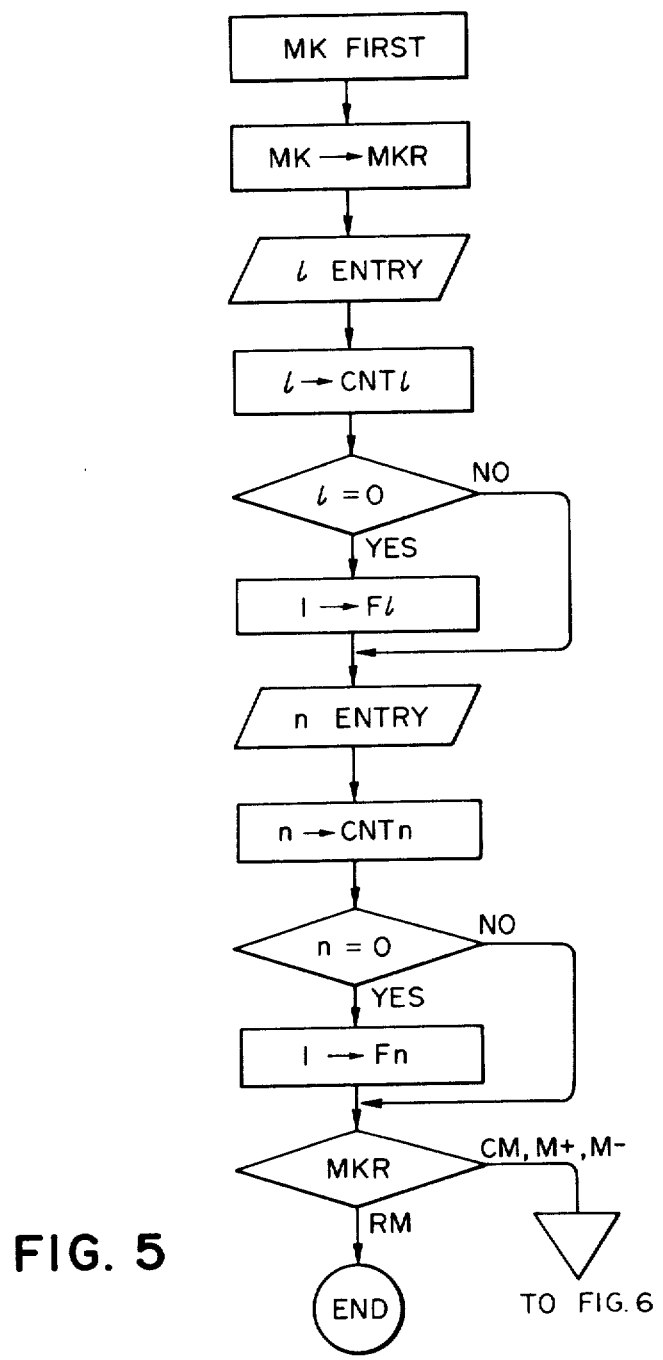
FIGS. 5, 6 and 7 are flow charts showing the operation of the memory addressing system of the present invention.
Figure 6:
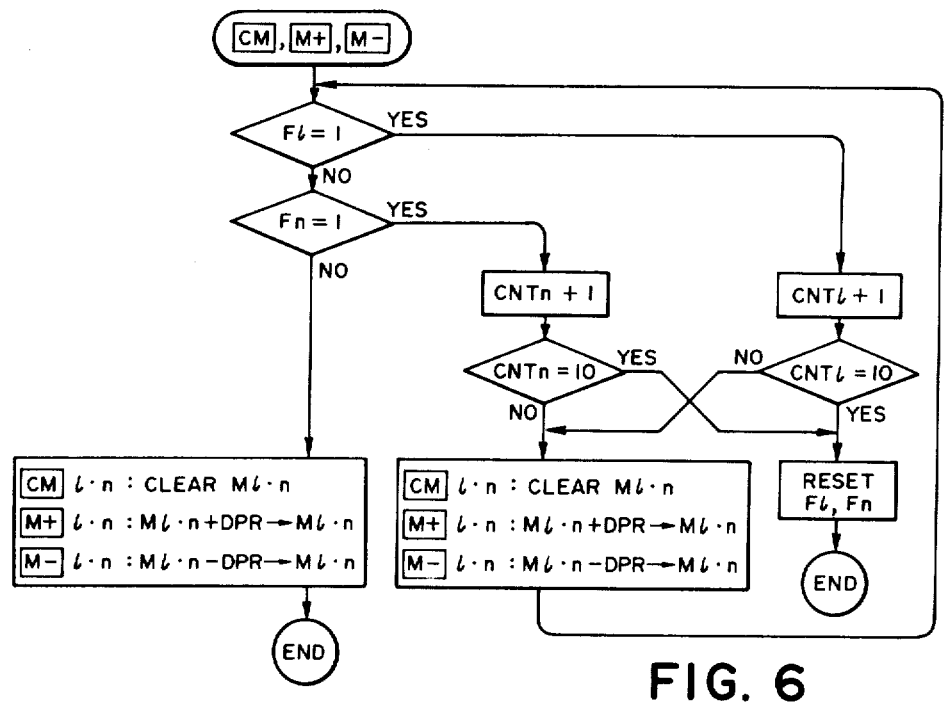
Figure 7:
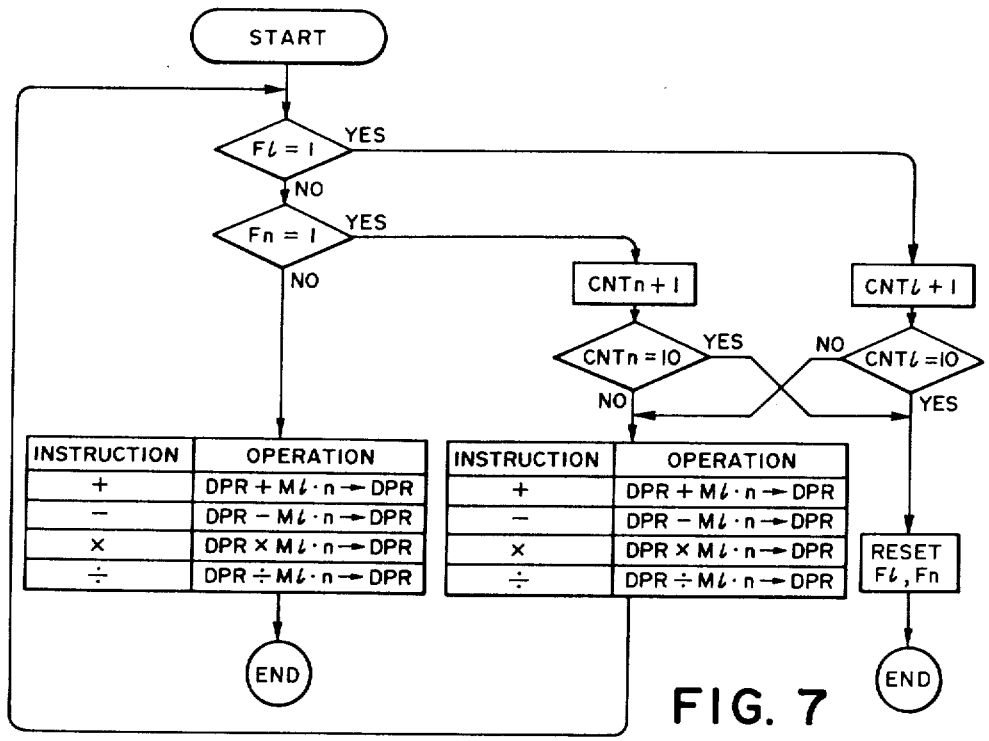

The flow charts shown in FIGS. 5 to 7 further show the sequences of storing the data in Tab. 1 in the memory MEM of the calculator of the present invention, as shown in FIG. 4, and calculating the total by shops, totals by articles, grand total and percentages of articles.

At first, the entire memory MEM is cleared by the key operations "CM-1-.-0" followed by "CM-2-.-0", . . ., "CM-9-.-0" in succession. Referring to FIG. 5 and in response to said key operations "CM-1-.-0", a memory clear instruction generated by the key "CM" is entered in the register MKR, and the following key actuation "1" introduces an address signal l=1 into the counter CNT1. The processor CPU performs no operation in response to the succeeding key actuation ".", and the following numeral key actuation "0" enters a signal n=0 to the counter CNTn to shift the content thereof to "0", whereby the flip-flop Fn is set to release a level-1 signal. Since the register MKR already stores the memory clear instructions CM, the program proceeds according to the flow chart shown in FIG. 6. Because of the flip-flops are respectively in the states Fl=0 and Fn=1 at this time, the processor CPU supplies a step advance signal to the counter CNTn to change the content thereof to "1". In this manner the area at the first line and first column in the memory MEM is cleared as if by the key operations "CM-1-.-1". Since the flip-flop Fn remains in the state "1", the content of the counter CNTn is step increased to "2". Successively an identification step is executed to see if said content is equal to "10". Since the content is not "10" in this state, an instruction corresponding to "CM-1-.-2" is executed to clear an address area at the first line and second column in the memory MEM. Thereafter the memory clear instructions corresponding to "CM-1-.-3", through, "CM-1-.-9" are executed in succession until the content of said counter CNTn reaches "10", whereby the flip-flop Fn is reset to complete the memory clear instruction entered by "CM-1-.-0". Subsequently the memory clear instructions "CM-2-.-0", through "CM-9-.-0" are executed in the same sequences as explained above to clear the entire memory MEM. Naturally such memory clearing can also be achieved by the key operations "CM-0-.-1", through "CM-0-.-9".

Now the data in Tab. 1 are stored in the memory MEM by allowing one line for each retail shop and one column for each article. At first the data "2000" for the article (a) for the shop A are stored in the address at the first line and first column by the numeral key actuations "2-0-0-0" followed by the actuations of memory control keys MK and numeral keys KB in the order of "M+-1-.-1". Thus said in response to this sequence of key operations data are first entered in the arithmetic register AR and the display register DPR of the processor CPU, whereby said data are displayed on the display device DIP. Then, in response to the key actuations "M+-1-.1", the calculation Ml·n+DPR→Ml·n is executed since the flip-flops Fl, Fn are in the reset state to produce level-0 signals because of the condition l=n=0 in this state. Since the memory MEM is already cleared, the data "2000" stored in the display register DIP become the input signal MIN to the memory MEM and are stored in the address area at the first line and first column therein. Subsequently the data "8400" for the article (b) of the shop A are stored in the memory MEM by the numeral key actuations "8-4-0-0" followed by the actuations of the appropriate memory control key MK and numeral keys KB in the order of "M+-1-.-2", according to a procedure similar to that described above with reference to entry of the data "2000". In this manner the memory MEM is capable of storing the data as shown in FIG. 4. Now there will be explained the procedures of calculating the various totals and the percentages of the sales by shop and by article. For example, in order to calculate the total for the shop A, the clear key "C" in the numeral keys KB is actuated to clear the display register DPR and the arithmetic register AR, and the numeral keys KB and the memory control keys MK are actuated in the order of "+-RM-1-.-0", indicating an instruction of "read and add the data in the first line". Referring to FIG. 7, since l=1 and n=0, the flip-flop Fn is set to release a level-1 signal to shift the counter CNTn to "1". As CNTn ≠"10" in this state, the processor then executes an instruction DPR+M1·1→DPR, whereby the data "2000" read from the address at the first line and first column of the memory MEM are stored in the display register DPR cleared in advance. As the flip-flop Fn continues to release a level-1 output signal, the processor CPU incrementally advances the counter CNTn to "2". As CNTn ≠"10" in this state, the processor CPU executes the instruction DPR+M1·2→DPR. The data "2000" already stored in the display register DPR are added to the data "8400" read from the address at the first line and second column of the memory MEM and stored in the arithmetic register AR by means of the arithmetic logic unit ALU, and the result of addition "10400" is entered in the display register DPR. When the processor CPU completes the addition of the data up to the address at the first line and ninth column of memory MEM, the counter CNTn is shifted to "0" to reset the flip-flop Fn. Successively the additions of the data for the articles (c), (d) and (e) of the shop A are conducted in a similar manner to finally obtain the total "13610" for the shop A, which is displayed on the display device DIP. From the foregoing it will be apparent that the total for the shop B can be obtained by the key actuations in the order of "C-+-RM-2-.-0-=", wherein the first key actuation "C" is required for erasing the total for the shop A stored in the display register DPR. Consequently the combined total for the shops A and B can be obtained by eliminating said key actuation "C". Also the grand total including the figures for the shops C and D can be obtained by subsequent key actuations in the order of "+-RM-3-.-0=-+-RM-4-.-0-=", whereby the grand total "40520" is displayed on the display device DIP. Also the percentage of each article is obtained by dividing the total for each article by "grand/total/100". for example key actuations "=-RM-0-.-3-=" provide the total "1750" for the article (c), which is converted into a percentage "4.32" (%) for the article (c) by the key actuations "÷-4-0-5-.-2-=" on the display device DIP.

As explained in detail in the foregoing, the memory address system of the present invention for electronic calculators allows automatic sequential access to plural addresses by only one memory addressing to execute erasure and processing of the data stored in predetermined areas of the memory. Therefore, an ordinary electronic calculator using this memory addressing system can be used easily in the accounting, inventory control and similar data processing tasks which have previously required calculators specifically designed for such purposes.

What I claim is:

1. A memory addressing system comprising:

memory means having at least one memory area that includes a plurality of addressable locations;

a keyboard including input keys being operable to designate different ones of said plurality of addressable memory locations, a plurality of said keys capable of being operated in at least one specific sequence to designate one said memory area;

detecting means for detecting operation of said plurality of said keys in said one specific sequence to designate said one memory area and including means for generating an output signal indicative of said detection; and special access means for sequentially accessing all of said addressable memory locations in said one area in response to said output signal.

2. A memory addressing system according to claim 1, wherein said memory means comprises a matrix of lines of addressable memory locations and columns of addressable memory locations, and wherein said area is either one of said lines or one of said columns.

3. A memory addressing system according to claim 1, wherein said input keys include a numeric zero key, said special access means being operable in response to actuation of said numeric zero key.

* * * * *

UNITED STATES PATENT AND TRADEMARK OFFICE
CERTIFICATE OF CORRECTION

PATENT NO. : 4,380,053

DATED : April 12, 1983

INVENTOR(S) : HIROSHI TAKAHASHI

It is certified that error appears in the above-identified patent and that said Letters Patent is hereby corrected as shown below:

Column 1

Line 66, after "key", change "=" to --"=", --.

Column 2

Line 7, after "of", change "l" to --$\ell$--,

Line 20, after "81", change "address" to --addresses--,

Line 41, after "flip-flops" change "Fl" to --F$\ell$--;
        and after "counters", change "CNT1" to --CNT$\ell$--, Line 48, after "flip-flops" change "Fl" to --F$\ell$--; and
        change "set respectively" to --respectively set--, line 49, change "1=0" to --$\ell$=0--; after "in", insert --a--;
        and after "address", change "1.n" to --$\ell$.n--.

Line 52, after "counters" change "CNT1" to --CNT$\ell$--,

Line 53, after "numbers" change "1" to --$\ell$--,

UNITED STATES PATENT AND TRADEMARK OFFICE
CERTIFICATE OF CORRECTION

PATENT NO. : 4,380,053
DATED : April 12, 1983
INVENTOR(S) : HIROSHI TAKAHASHI

It is certified that error appears in the above—identified patent and that said Letters Patent is hereby corrected as shown below:

Column 2 (Continued)

Line 55, after "instructions" change "1 + 1" to --$\ell$ + 1--,

Line 56, after "numbers" change "1" to --$\ell$--, and after "n" change "include a" to --have the--, Line 61, change "CNT1" to --CNT$\ell$--, Line 62, change "IDEC" to --$\ell$DEC--, Line 63, change "CNT1" to --CNT$\ell$--, Line 64, after "signals", change "1 + 1" to --$\ell$ + 1--, Line 65, after "signals", change "L or N" to --$\ell$ or n--, Line 66, after "coders" change "1DEC" to --$\ell$DEC--; and after "value" change "1=10" to --$\ell$=10--.

Column 3

Line 2, after "and", change "F1" to --F$\ell$--,

Line 37, after "signal" change "1=1" to --$\ell$=1--,

Line 38, change "CNT1" to --CNT$\ell$--,

Line 46, after "states" change "F1=0" to --F$\ell$=0--.

UNITED STATES PATENT AND TRADEMARK OFFICE
CERTIFICATE OF CORRECTION

PATENT NO. : 4,380,053
DATED : April 12, 1983
INVENTOR(S) : HIROSHI TAKAHASHI

It is certified that error appears in the above—identified patent and that said Letters Patent is hereby corrected as shown below:

Column 4

Line 2, after "by" change "allowing" to --allotting--,

Line 13, after "calculation" change "M1.n + DPR→M1.n" to --M$\ell$.n + DPR→M$\ell$.n--, Line 14, after "flip-flops" change "F1" to --F$\ell$--, Line 15, after "condition" change "1=n=0" to --$\ell$=n=0--, Line 37, after "since", change "1=1" to --$\ell$=1--.

Signed and Sealed this

Twenty-ninth Day of November 1983

[SEAL]

Attest:

GERALD J. MOSSINGHOFF

Attesting Officer     Commissioner of Patents and Trademarks